B. M. GIROUX.
STAGE SETTING.
APPLICATION FILED DEC. 27, 1915.

1,196,104.

Patented Aug. 29, 1916.
6 SHEETS—SHEET 1.

Witnesses
Inventor
Benjamin M. Giroux

B. M. GIROUX.
STAGE SETTING.
APPLICATION FILED DEC. 27, 1915.

1,196,104.

Patented Aug. 29, 1916.
6 SHEETS—SHEET 3.

Witnesses:

Inventor
Benjamin M. Giroux

B. M. GIROUX.
STAGE SETTING.
APPLICATION FILED DEC. 27, 1915.
1,196,104.
Patented Aug. 29, 1916.
6 SHEETS—SHEET 4.
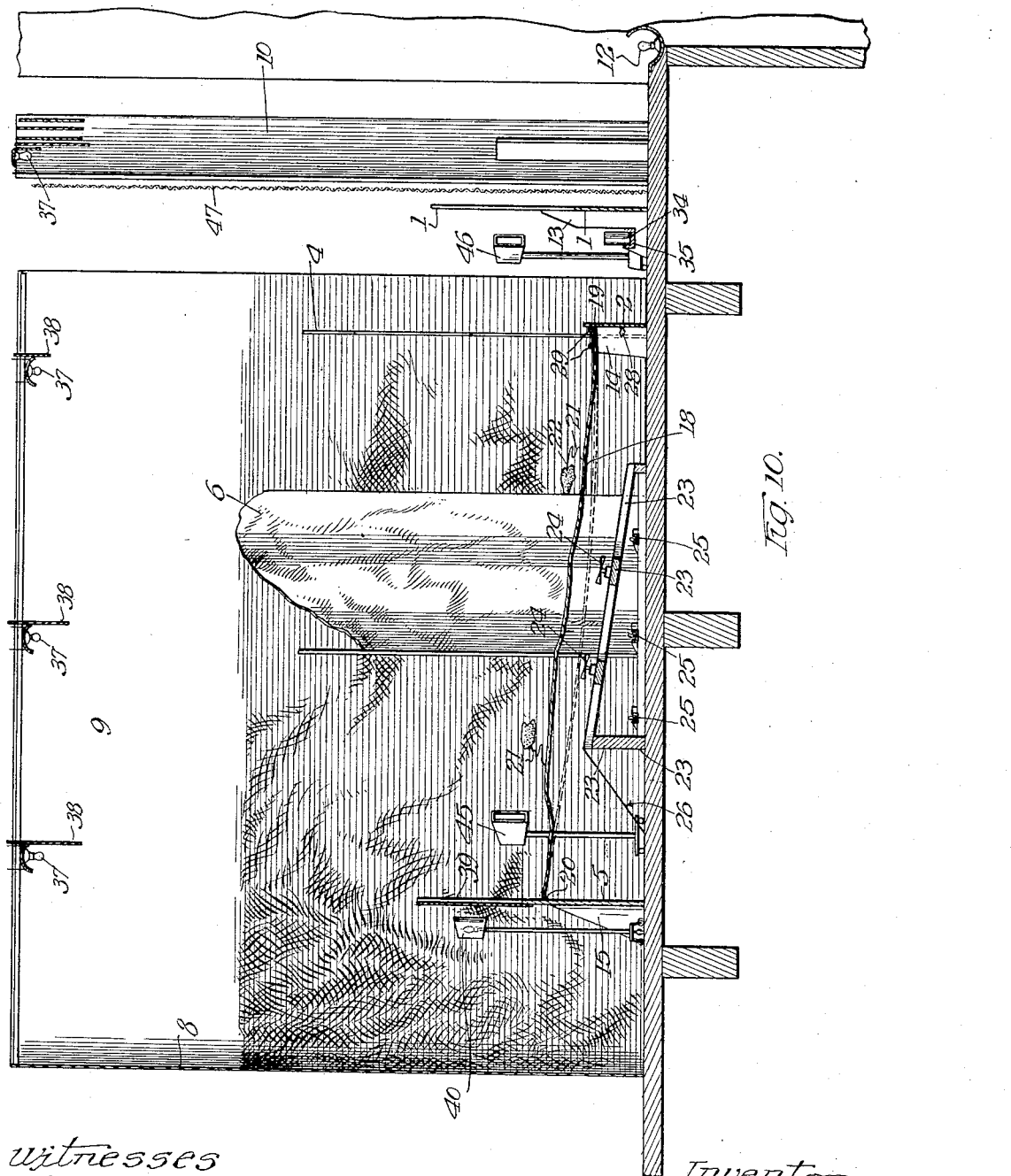
Fig. 10.
Witnesses
Inventor
Benjamin M. Giroux

B. M. GIROUX.
STAGE SETTING.
APPLICATION FILED DEC. 27, 1915.

1,196,104.

Patented Aug. 29, 1916.
6 SHEETS—SHEET 5.

Witnesses:
Robert H. Weir
Arthur W. Carson

Inventor
Benjamin M. Giroux
By Hill & Hill
Attys

B. M. GIROUX.
STAGE SETTING.
APPLICATION FILED DEC. 27, 1915.
1,196,104.
Patented Aug. 29, 1916.
6 SHEETS—SHEET 6.
Fig. 12.
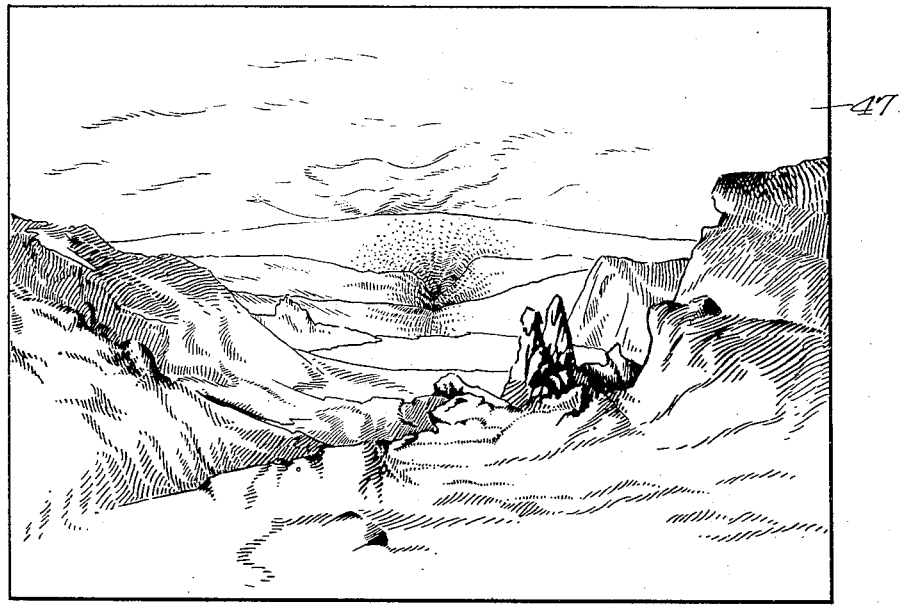
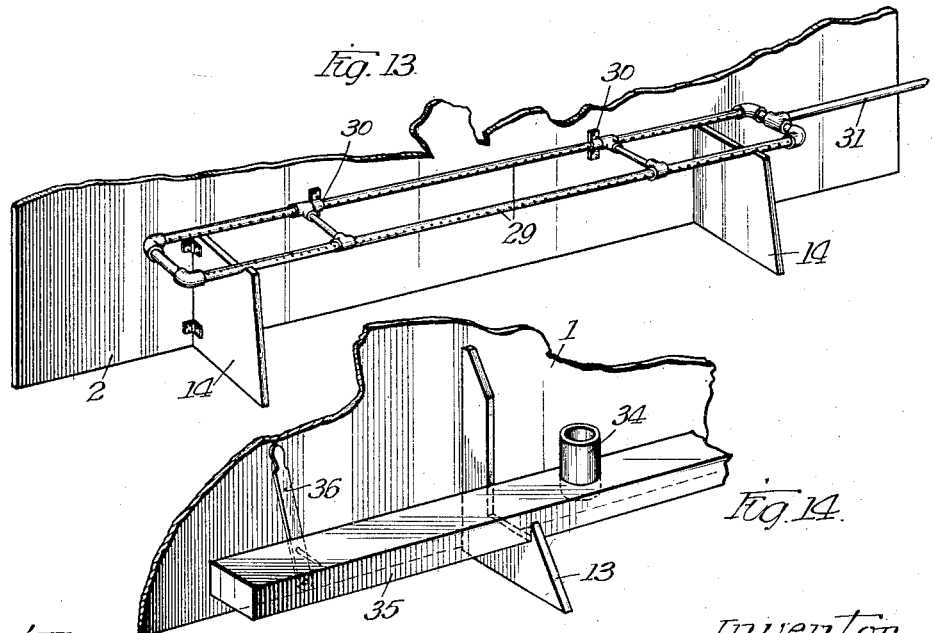
Witnesses:
Inventor
Benjamin M. Giroux
By Hill & Hill
Attys

UNITED STATES PATENT OFFICE.

BENJAMIN M. GIROUX, OF CHICAGO, ILLINOIS.

STAGE-SETTING.

1,196,104. Specification of Letters Patent. Patented Aug. 29, 1916.

Application filed December 27, 1915. Serial No. 68,775.

*To all whom it may concern:*

Be it known that I, BENJAMIN M. GIROUX, a citizen of the United States, residing at Chicago, in the county of Cook and State of Illinois, have invented certain new and useful Improvements in Stage-Settings, of which the following is a description.

My invention belongs to that general class of devices known as stage settings, and relates particularly to apparatus for producing a new, novel and realistic setting for use in theaters or the like, wherein the setting to all intents and purposes is so realistic that it very nearly, if not entirely, in appearance approaches a natural effect or setting of nature. It may be said that the setting shown and described is intended to represent a volcano in eruption.

The invention has among its objects the production of apparatus of the kind described that is simple, efficient, realistic, and highly attractive, ornamental and entertaining.

It also has among its objects the production of a realistic scene in a most striking manner, and yet in a most simple way.

It also has among its objects the production of apparatus for the purpose set forth that may be easily and quickly set up or knocked down and conveniently transported from place to place with comparative ease.

Other objects and advantages of the invention will be apparent to those skilled in the art to which the same pertains from the disclosure herein given.

To this end my invention consists in the novel construction, arrangement and combination of parts herein shown and described, and more particularly pointed out in the claims.

Figure 1:
Figure 2:
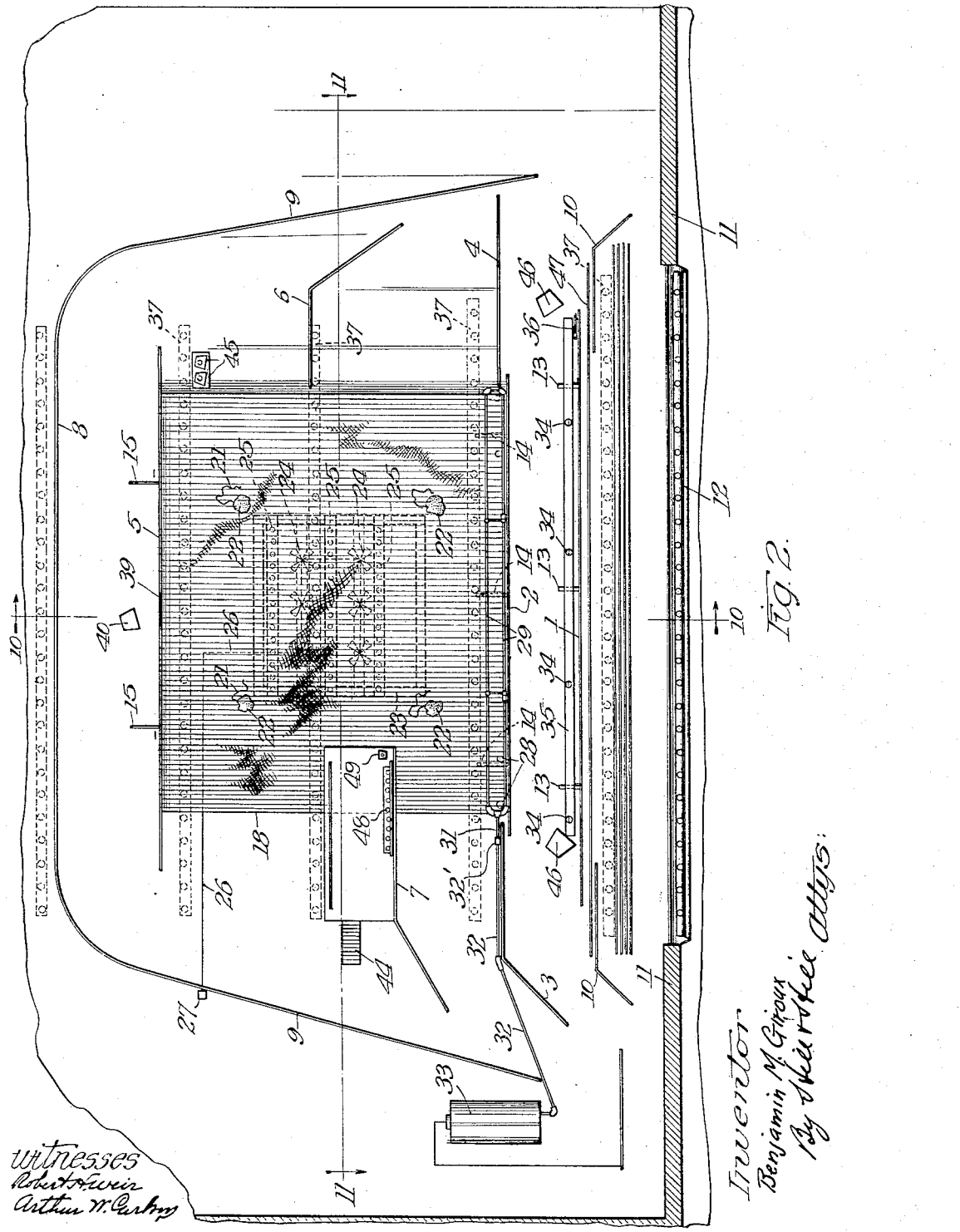
Figure 3:
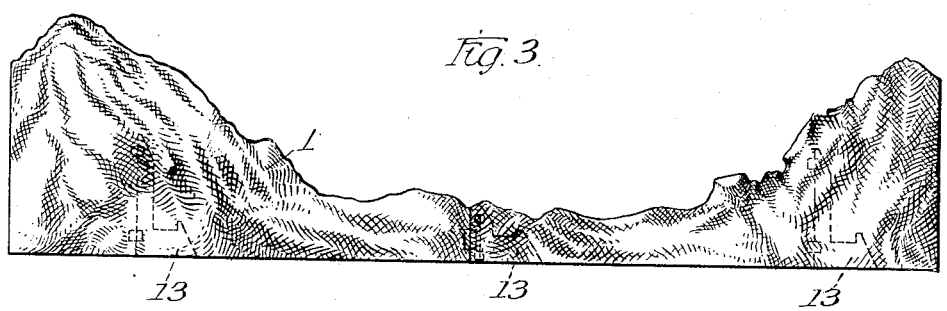
Figure 4:
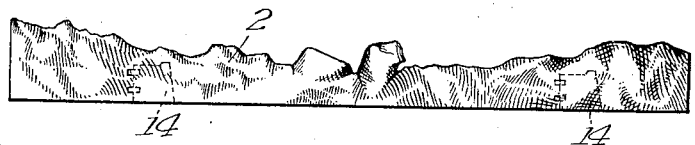
Figure 5:
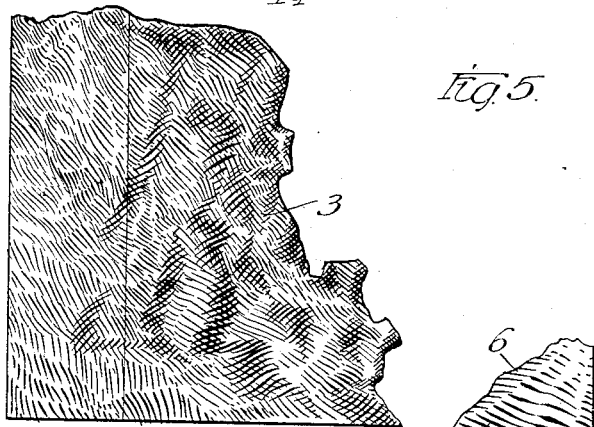
Figure 6:
Figures 7, 8:
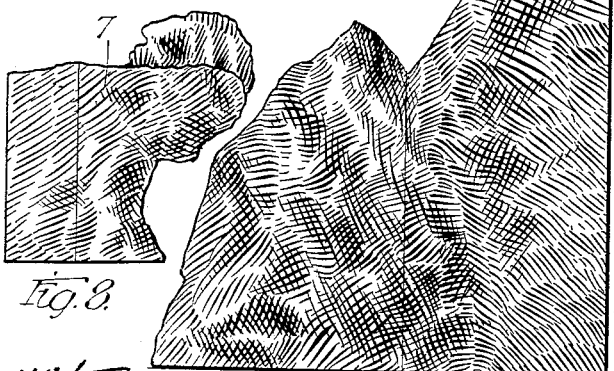
Figure 9:
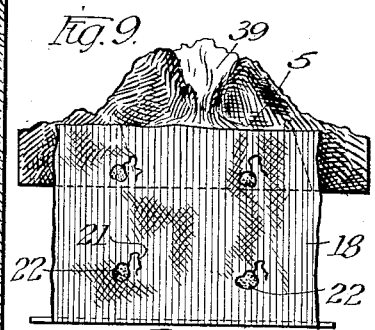
Figure 11:
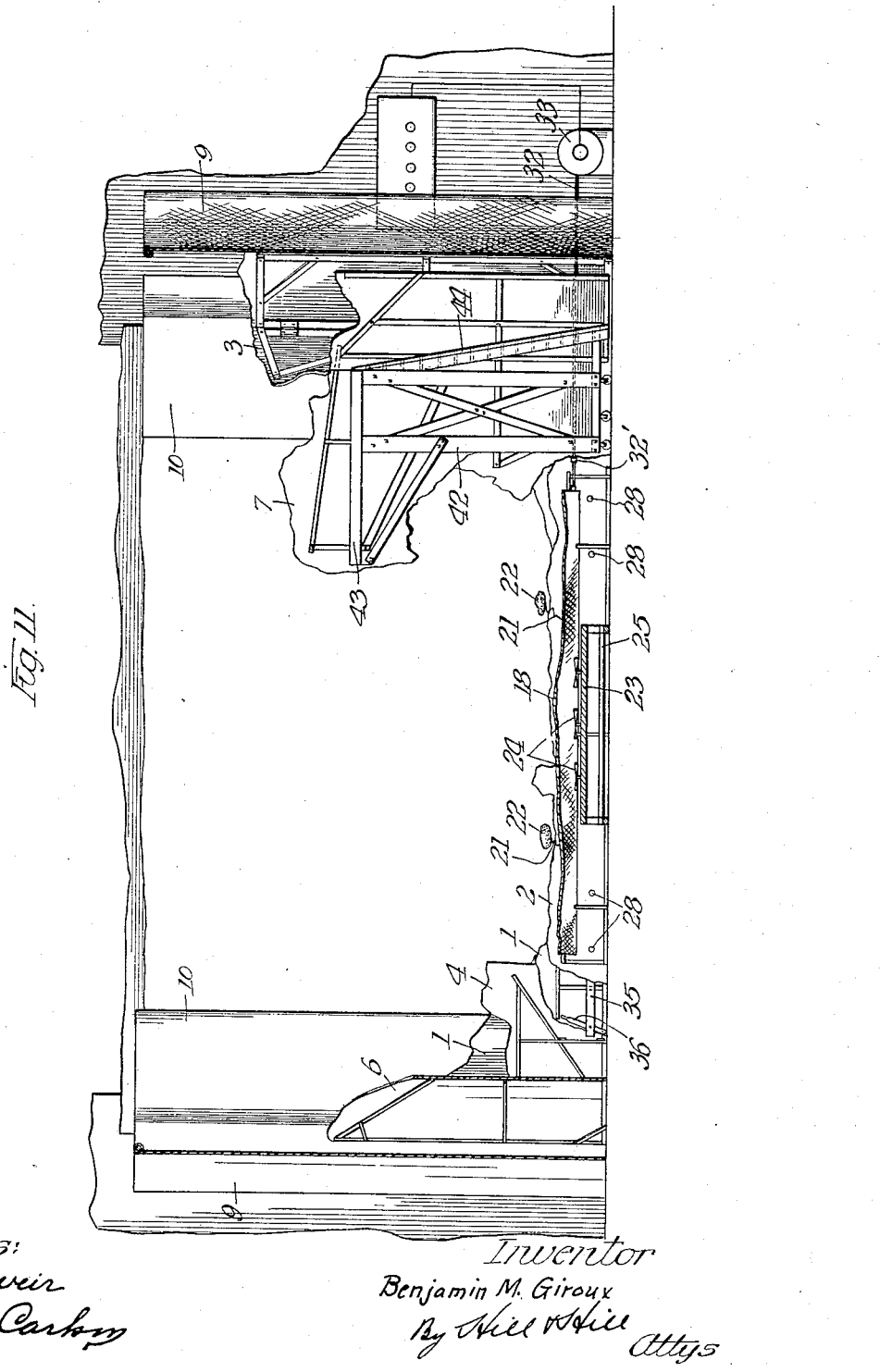

In the drawings, wherein like reference characters indicate like or corresponding parts, Figure 1 is a front elevation of the apparatus or setting with the panoramic curtain raised; Fig. 2 is a plan view of the same; Fig. 3 is a reduced view in elevation of set piece 1; Fig. 4 is a similar view of set piece 2; Fig. 5 is a similar view of set piece 3; Fig. 6 is a similar view of set piece 4; Fig. 7 is a similar view of set piece 6; Fig. 8 is a similar view of set piece 7; Fig. 9 is a similar view of set piece 5; Fig. 10 is a sectional view taken substantially on line 10, 10 of Fig. 2; Fig. 11 is a sectional view taken substantially on line 11, 11 of Fig. 2; Fig. 12 is a front elevation of the panoramic curtain; Fig. 13 is a perspective view of the rear of set piece 2, with the steam apparatus carried thereby; Fig. 14 is a similar view of set piece 1, with the clearers carried thereby.

It may be mentioned that the setting herein shown and described is particularly intended to show or represent a volcano in eruption and adapted for theatrical purposes, it being understood that the stage settings or set pieces and the cyclorama may be modified or changed to any desired extent. The appearance of the setting after the curtain has been raised is crudely illustrated in Fig. 1, showing the various set pieces. The set pieces are shown detached in Figs. 3 to 9, the scales being varied in the several figures. The arrangement or settings of the same is most clearly shown in Fig. 2. Set piece 1 is arranged at the front of the stage, set piece 2 slightly back, set pieces 3 and 4 being arranged substantially at each end and back of the set piece 2. Set pieces 6 and 7 are arranged substantially centrally or midway down the stage, and set piece 5 near the rear, the whole being surrounded by the cyclorama 8 extended on the sides, as at 9. Other pieces 10 are arranged one on each side, these being technically called tormentors, and ordinarily provided with doors to permit entrance to the front of the stage in front of set piece 1. As mentioned the arrangements and number of set pieces depends on the effect desired and what is depicted on them.

The stage is shown set or constructed back of the arch or wall 11 and the footlights 12 arranged in the usual manner. The set pieces, as usually constructed, consist of a suitable framework over which is stretched canvas, or other material suitable for the purpose, which is painted or otherwise decorated as desired. The set piece 1 is formed with supports 13 at the back, arranged to support or brace the set piece in upright position and prevent its falling over. These supports are shown hinged at the back and the set piece hinged at the center so that it may be folded up in small space for storage or shipping, or the parts detached, as may be desired. Set piece 2 is also provided with supports 14, and set piece 5 with similar supports 15, which may be arranged to be secured to the floor. Arranged between set piece 2 and the set piece 5 is a sheet or curtain 18 (Figs. 2, 10 and 11) of suitable material, the same being preferably red cloth that is substantially translucent. The forward end is secured or anchored at 19 (Fig. 10) to set piece 2, and the back end at 20 to set piece 5, the curtain being substantially horizontal, but with the rear end preferably slightly higher than the forward end. It may be mentioned that the curtain 18 is preferably of greater length than the distance between the two set pieces, or slack, so that it may be suitably agitated and rise and fall irregularly throughout its area. I have also shown several sponges 22, or other suitable equivalent for the purpose, secured to the curtain by cords 21, these sponges being blackened, or otherwise treated, are intended to represent stones or boulders, which appear to be thrown up from the crater of the volcano.

Arranged below the curtain 18 is a suitable framework 23, which carries means for dispensing air currents, as shown, one or more fans 24, and also arranged on the frame is a series of lights 25, a portion at least being preferably red lights. As the fans are driven the curtain 18 rises and falls irregularly and the sponges 22 are thrown up and dropped back so that with the settings arranged as shown the spectator apparently sees the crater of a volcano in violent eruption. If desired, in addition to the fans, the curtain may be manually agitated by men stationed for that purpose, the same, however, positioning themselves so as not to be seen by the audience. To increase the illusion I preferably discharge a vapor, as for example, steam, adjacent the curtain 18, and also produce smoke, so that the illusion is to all intents and purposes perfect.

Referring particularly to Figs. 2, 10 and 13, arranged just back of the set piece 2 is a steam pipe consisting of the coil 29, having a series of perforations or apertures therein. This pipe or coil is preferably hinged to the set piece as at 30, and is carried by the supports 14 when the same are open. When the supports 14 are closed against the set piece the coil may be dropped and be carried by the set piece for convenience in storing or transporting. The steam coil 29 is connected to a pipe 31, which is connected to pipe 32 through the union 32', pipe 32 being suitably connected to a steam generator or boiler 33 of any suitable type.

Arranged back of set piece 1 are one or more smoke pots 34, commonly called clearers, the same being arranged to produce smoke by burning suitable materials or chemicals. To add to the illusion the smoke pots 34 are arranged on a movable carrier or bar 35 carried by the supports 13 (see Figs. 2 and 14), the pots being moved by actuating the lever 36, suitably connected with the bar 35, or in an equivalent manner.

Arranged above the stage in the usual manner are the lights 37, shielded from view by the drops 38. I also arrange a suitable light 40 back of the set piece 5, same being arranged to throw on a transparent part 39 of set piece 5, as most clearly shown in Figs. 2, 10 and 1. I have shown the set piece 7 (Fig. 11) provided with a frame 42, arranged to carry a platform 43, which may be reached by means of the stairs 44. Lights 45 and 46 are arranged substantially as shown, the purpose of these being to throw a suitable effect on a transparent or translucent curtain 47 arranged before set piece 1.

What I have termed lights 45 and 46 are what are ordinarily known in the profession as spot light lamps, and more especially sciopticon by some, which are adapted to throw light where desired, the device being equipped with suitable lenses, etc. These lights are equipped with what are sometimes known in the trade as electric stage effects, which generally consists of a rotatable disk of suitable material actuated by clock movement, by hand, or the like, the construction being that the light passes through certain portions of the disk as the same is rotated, giving the desired effects on a screen. Sometimes the light is thrown on the front of the opaque screen and sometimes from the back on a transparent or translucent screen. By means of the effects are obtained moving clouds, water effects, rain effects, fire and smoke effects, and the like. I have referred to curtain 47 as being transparent. As a matter of fact the same is more nearly translucent. It is not necessary that the whole curtain be translucent or transparent, but only the part at which the effect is to be placed, the other part being opaque. In the present case I use suitable stage effects to give a volcano effect at the desired point on the curtain. These various effects are well known among the profession, and I do not consider it necessary to describe them in greater detail than herein given.

The transparent curtain 47 is shown in Fig. 12. This illustrates, among other things, the scene shown in Fig. 1, except, of course, the scene is at a great distance away and consequently not shown in any way in detail. When the lights from the sciopticons (also called spot lights) 45 and 46 are thrown on the transparent curtain from the rear and manipulated, smoke may be apparently made to come from the volcano, and cloud effects obtained by apparatus commonly known as electric stage effects. In use the curtain 47 is set before all of the apparatus shown in other figures and the cast, or certain members of the company can pass before the curtain on their way to the crater of the volcano. After they pass by, the effect lights may be cut out and the curtain may then be raised so that the crater may be disclosed. I do not consider it necessary to illustrate any of the details of lighting effects, etc., or details in shifting or raising the curtain and bringing the crater in view, as the usual practices, well known in the profession, are followed.

As the curtain is raised, that is the curtain 47, the crater of the volcano is seen, the curtain 18 not resembling a curtain, however, rising and falling due to the fans 24, the same glowing, owing to the lights 25, the vapor, or in the case illustrated, steam being discharged from the pipes 29 and smoke from the clearers 34. The lights 28 flash on and off and the imitation rocks 22 are apparently thrown up by the violent boiling in the depths of the crater. The lighting effects are arranged to give a realistic appearance, it being considered unnecessary and impossible to attempt to describe in detail the lighting effects, and to the observer or audience is shown a volcano erupting, with smoke, steam arising, and boulders rising and falling as if boiling and seething. The set pieces and cyclorama show the foreground and background, and the illusion is practically perfect. It is practically impossible to illustrate or describe the effect or illusion by pen and ink drawings or words, it being necessary to see the actual scene, or the next best thing, photographs, in order to appreciate this perfect illusion. I have shown the apparatus and those set pieces, the like of which I have employed for this purpose, it being understood that various immaterial modifications may be made, depending upon circumstances. The apparatus shown and described is that considered suitable and desirable for illustrating Mount Pelee, in the Hawaiian Islands, in the Bird of Paradise show, the cyclorama and set pieces might be varied in representing other places or scenes.

Having thus described my invention, it is obvious that various immaterial modifications may be made in the same without departing from the spirit of my invention; hence I do not wish to be understood as limiting myself to the exact construction, arrangement or combination of parts herein shown and described, or uses mentioned.

What I claim as new and desire to secure by Letters Patent is:—

1. In a device of the kind described, a suitable stage setting, in combination with a substantially horizontal curtain secured to provide a fullness therein, means for agitating said curtain, and means for discharging a vapor in proximity thereto, to simulate steam and smoke, substantially as described.

2. A device of the kind described, a suitable stage setting, in combination with a substantially horizontal curtain secured to provide a fullness therein, means for agitating said curtain, parts connected to the curtain for relative free movement and adapted to be projected as the curtain is thrown upward, and means for discharging a vapor in proximity to the curtain to simulate steam and smoke proceeding therefrom.

3. A device of the kind described, a suitable stage setting, in combination with a substantially horizontal curtain secured to provide a fullness therein to permit a vertical movement thereof, means for throwing light effects upon said curtain and modifying the same as desired, and means for ejecting a vapor in proximity to the curtain to simulate steam and smoke proceeding therefrom, substantially described.

4. In a device of the kind described, a suitable stage setting, in combination with a substantially horizontal curtain secured to permit a fullness therein to permit vertical action, means for vertically oscillating the curtain, suitable bodies having flexible connection with the curtain and adapted to be projected by the vertical lift thereof, means for throwing light effects upon the curtain and modifying the same as desired, and means for ejecting a vapor in proximity to the curtain to simulate steam and smoke proceeding therefrom.

5. In a device of the kind described, a substantially horizontal curtain secured to provide fullness therein, and means for vertically operating the curtain, in combination with means for throwing light effects upon the curtain, means for ejecting a vapor in proximity to the curtain, and independent means for delivering a smoke-like vapor in proximity thereto.

6. In a device of the kind described, a substantially horizontal curtain secured to provide a fullness therein to permit a vertical movement in the body thereof, and means for vertically agitating the curtain, in combination with means for throwing light effects upon the curtain, means for ejecting a vapor in proximity thereto, independent means for delivering a smoke-like vapor in proximity to the curtain, and means for controlling the point where smoke-like vapors are to be released at will, substantially described.

7. In a device of the kind described, a suitable stage setting, in combination with a substantially horizontal curtain secured to permit a fullness therein, means for directing a current of air on the underside of the curtain, means for directing light effects upon the curtain and modifying said lights as desired, means for ejecting a steam-like vapor in proximity to the curtain, independent means for delivering a smoke-like vapor, also in proximity to the curtain, both simulating the discharge of steam and smoke from the curtain, and means for changing the position of the smoke delivering parts at will, substantially described.

8. A device of the kind described, comprising a curtain of suitable material, means positioned adjacent the curtain arranged to produce and direct a current of air on the curtain, whereby the same will be agitated, means for illuminating said curtain, and adjustable means for dispensing smoke at different points adjacent thereto.

9. A device of the kind described, comprising a curtain of suitable material disposed substantially horizontally, means positioned adjacent the curtain, arranged to produce and direct a current of air on the curtain, whereby the same will be agitated, means for periodically illuminating said curtain from under side of curtain, means for dispensing smoke adjacent thereto, and a movable support for said means whereby the point of discharge of the smoke may be varied at will.

10. A stage setting of the kind described, comprising the combination of an extending curtain of suitable material, arranged substantially horizontally, but with one end slightly higher than the other, with means arranged adjacent to said curtain for irregularly agitating the same, means arranged adjacent said curtain for illuminating the same, means for discharging a vapor such as steam adjacent thereto, and scenic set pieces the pictorial representations resembling the crater of a volcano and arranged to conceal the agitating and illuminating means and said vapor discharging means.

11. A stage setting of the kind described, comprising the combination of an extending curtain of suitable translucent material, arranged substantially horizontally, but with one end slightly higher than the other, and secured to provide a fullness therein, with means arranged adjacent to said curtain for irregularly agitating the same, means arranged adjacent said curtain for illuminating the same, means for discharging a vapor adjacent thereto, and scenic set pieces arranged to portray the crater of a volcano, to conceal the agitating and illuminating means and said vapor discharging means.

12. A setting of the kind described, comprising a combination of a curtain of suitable material, arranged substantially horizontally, supports therefor, said curtain anchored at each end to said supports, and of greater length than the distance between the supports, a fan disposed below said curtain and arranged to direct a current of air against the under side of the curtain, illuminating means arranged below said curtain, concealed means for conducting and discharging steam adjacent one support, a set piece arranged adjacent said curtain across the front end of said curtain, and means concealed by said set piece for producing smoke from the rear of said set piece, comprising a smoke dispenser, and means for moving said pot from one end of said set piece.

13. A setting of the kind described, comprising a combination of a suitable number of set pieces portraying a volcano crater, and a curtain of suitable material, arranged substantially horizontally among said set pieces, supports therefor, said curtain anchored at each end to said supports, and of greater length than the distance between the supports, a fan disposed below said curtain and arranged to direct a current of air against the under side of the curtain, illuminating means arranged below said curtain, concealed means for conducting and discharging steam adjacent one support, a set piece arranged adjacent said curtain across the front end of said curtain, and means concealed by said set piece for producing smoke from the rear of said set piece, comprising a smoke dispenser, and means for changing the position of the dispenser.

14. A device of the kind described, comprising a curtain of suitable material, disposed substantially horizontally, concealed means for directing a current of air on the under side of the curtain, concealed means for both centrally and intermittently illuminating the curtain, suitable scenic pieces arranged adjacent to and about said curtain, and means invisible from the front side of said scenic pieces for discharging steam and smoke vapor adjacent the curtain.

15. In a device of the kind described, a suitable removable curtain in combination with a suitable stage setting arranged back of said curtain, illuminating means disposed back of said curtain and arranged to be controlled as desired; a second curtain arranged at an angle to said first mentioned curtain and in the stage setting, means for agitating said second curtain, and concealed means for discharging a vapor in proximity thereto to simulate steam and smoke when the first curtain is removed, substantially as described.

16. In a device of the kind described, a substantially horizontal curtain mounted to provide a fullness therein, whereby to permit of vertical movement in the body thereof, and means for agitating the curtain, in combination with means for delivering a smoke like vapor in proximity to the curtain, and means for controlling the point where smoke like vapors are to be released at will.

17. In a device of the character described, the combination of a substantially horizontal curtain supported to provide a fullness therein, whereby to permit of vertical movement in the body thereof, means for agitating the curtain, means for throwing light effects upon the curtain, means for delivering smoke like vapor in proximity to the curtain, and means for controlling the point where the smoke like vapors are to be released at will.

18. In a device of the character described, the combination of a substantially horizontal curtain supported to provide a fullness therein, whereby to permit of vertical movement in the body thereof, means for agitating the curtain, means for throwing light effects upon the curtain, means for ejecting steam in proximity thereto, independent means for delivering a smoke like vapor in proximity to the curtain, and means for controlling the point where the smoke like vapors are to be released at will.

19. In a device of the kind described, a substantially horizontally disposed curtain inclining from the rear edge thereof toward the front, lighting means to give the curtain a semblance of fire, means for delivering smoke like vapor in proximity to the curtain, and an adjustable support for said means whereby to control the point where the vapors are to be released at will.

20. In a device of the kind described, the combination of a substantially horizontally disposed curtain, lighting means to give to said curtain the effect of fire, set pieces cooperating with the curtain to portray the crater of a volcano, and means for discharging adjacent the curtain both steam and smoke whereby to indicate a volcano in eruption.

21. In a device of the kind described, a suitable stage setting, in combination with a substantially horizontal curtain secured to permit a fullness therein, means for directing a current of air on the underside of the curtain, means for directing light effects upon the curtain and modifying said lights as desired, means for ejecting a steam-like vapor in proximity to the curtain, independent means for delivering a smoke-like vapor, also in proximity to the curtain, thereby simulating the discharge of steam and smoke from the curtain.

22. A stage setting of the kind described, comprising the combination of an extended curtain of suitable translucent material, arranged substantially horizontally, but with one end slightly higher than the other, and secured to provide a fullness therein, with means arranged adjacent to said curtain for irregularly agitating the same, means arranged adjacent said curtain for illuminating the same, and scenic set pieces arranged to portray the crater of a volcano, to conceal the agitating and illuminating means.

23. A setting of the kind described, comprising a combination of a curtain of suitable material, arranged substantially horizontally, supports therefor, said curtain being anchored at each end to said supports, and of greater length than the distance between the supports, a fan disposed below said curtain and arranged to direct a current of air against the under side of the curtain, illuminating means arranged below said curtain, concealed means for conducting and discharging steam adjacent one support, and a set piece arranged adjacent said curtain across the front end of said curtain.

24. A device of the kind described, comprising a curtain of suitable material, disposed substantially horizontally, concealed means for directing a current of air on the under side of the curtain, concealed means for illuminating the curtain, suitable scenic pieces arranged adjacent to and about said curtain, and means invisible from the front side of said scenic pieces for discharging steam and smoke vapors adjacent the curtain.

25. In a device of the character described, the combination of a curtain supported to have a fullness therein, means at the back of the curtain for agitating the same, and separated members connected to the front of the curtain by flexible cords substantially as and for the purpose described.

26. In a device of the character described, the combination of a curtain supported to have a fullness therein, means at the back of the curtain for agitating the same, separated members connected to the front of the curtain by flexible cords substantially as and for the purpose described, and means for discharging vapor adjacent the curtain.

27. In a device of the character described, a curtain of translucent material and red in color, said curtain being supported to have a fullness therein, means behind the curtain for agitating the same and members flexibly connected to the front of the curtain for relative movement in the agitation of the latter, said members being of contracting color relative to the curtain.

28. A stage appliance to indicate a volcano in eruption comprising a substantially horizontally disposed curtain, means for imparting to the curtain a color resembling fire, means for agitating the curtain, and means for emitting smoke and steam adjacent the curtain.

29. In a device of the character described, the combination of a substantially horizontally disposed curtain, means for displaying light effects on the curtain, a set piece adjacent the curtain, and a conduit supported by said set piece, said conduit being adapted to discharge vapors adjacent the curtain.

30. In a device of the character described, the combination of a substantially horizontally disposed curtain, means for displaying light effects on the curtain, a set piece adjacent the curtain, and a conduit supported by said set piece, said conduit being adapted to discharge vapors adjacent the curtain, said conduit being pivotally connected with said set piece whereby to move from a position in contact with the set piece to a position outwardly therefrom, and means on the set piece for supporting the conduit in the last mentioned position.

31. In a device of the character described, the combination of a substantially horizontally disposed curtain, means for displaying light effects on the curtain, a set piece adjacent the curtain, and a conduit supported by said set piece, said conduit being adapted to discharge vapors adjacent the curtain, said conduit being pivotally connected with said set piece whereby to move from a position in contact with the set piece to a position outwardly therefrom, and means on the set piece for supporting the conduit in the last mentioned position, said means also constituting means for supporting the set piece in upright position.

32. In an apparatus of the character described, the combination of means to represent a volcano in eruption comprising a horizontally disposed flexible curtain adapted to simulate fire, means for agitating the curtain, and means for causing the escape of steam adjacent said curtain.

33. In an apparatus of the character described, the combination of a horizontally disposed sheet of flexible material, set pieces coöperating with said sheet to simulate the crater of a volcano, a blower arranged beneath said sheet and adjacent thereto adapted to directly act upon said sheet to cause portions thereof to yield relative to other portions, and means for causing a discharge of vapor adjacent said sheet.

34. In an apparatus of the character described, the combination of a substantially horizontally disposed sheet of material supported to have a fullness therein, a fan arranged directly beneath said sheet to agitate the latter, and means for discharging vapor adjacent said sheet.

35. In an apparatus of the character described, the combination of a substantially horizontally disposed sheet of flexible material having a fullness therein, lighting means beneath said sheet, and a plurality of blowers beneath said sheet adapted to act upon different portions thereof simultaneously to agitate the same.

36. In a device of the character described, the combination of a curtain with means for agitating the same, means for discharging adjacent to the curtain steam, and means for discharging adjacent to the curtain smoke, and means for imparting different light effects upon the commingled steam and smoke.

In testimony whereof, I have hereunto signed my name in the presence of two subscribing witnesses.

BENJAMIN M. GIROUX.

Witnesses:
W. W. TRYON,
H. W. LOSH.

Copies of this patent may be obtained for five cents each, by addressing the "Commissioner of Patents, Washington, D. C."